(12) United States Patent
Takahashi (10) Patent No.: US 9,926,929 B2
(45) Date of Patent: Mar. 27, 2018

(54) PUMP DEVICE

(71) Applicant: MIKUNI CORPORATION, Chiyoda-ku, Tokyo (JP)

(72) Inventor: Jun Takahashi, Iwate (JP)

(73) Assignee: MIKUNI CORPORATION, Tokyo (JP)

(*) Notice: Subject to any disclaimer, the term of this patent is extended or adjusted under 35 U.S.C. 154(b) by 301 days.

(21) Appl. No.: 14/761,160

(22) PCT Filed: Dec. 10, 2013

(86) PCT No.: PCT/JP2013/083058
§ 371 (c)(1),
(2) Date: Jul. 15, 2015

(87) PCT Pub. No.: WO2014/112247
PCT Pub. Date: Jul. 24, 2014

(65) Prior Publication Data
US 2015/0354563 A1 Dec. 10, 2015

(30) Foreign Application Priority Data
Jan. 15, 2013 (JP) ................................. 2013-004624

(51) Int. Cl.
*F04B 35/04* (2006.01)
*F04C 11/00* (2006.01)
(Continued)

(52) U.S. Cl.
CPC ............ *F04C 11/008* (2013.01); *F04B 17/03* (2013.01); *F04B 53/16* (2013.01); *F04C 2/102* (2013.01);
(Continued)

(58) Field of Classification Search
CPC ........ F04B 17/03; F04B 53/16; F04C 11/008; F04C 15/008; F04C 2/102; F04C 2240/808; F04D 13/0693; H02K 11/40
See application file for complete search history.

(56) References Cited

U.S. PATENT DOCUMENTS 3,952,218 A * 4/1976 Deters ................. H02K 5/132
310/71
5,969,445 A * 10/1999 Horiuchi ............... H02K 11/40
310/64

(Continued)

FOREIGN PATENT DOCUMENTS

EP 1455082 A1 9/2004
JP 3187224 * 5/2001
(Continued)

OTHER PUBLICATIONS

International Search Report corresponding to Application No. PCT/JP2013/083058; dated Mar. 11, 2014.
(Continued)

*Primary Examiner* — Charles Freay
(74) *Attorney, Agent, or Firm* — Cantor Colburn LLP (57) ABSTRACT

A pump device, a main body, a cover body, a stator module at least a portion of the external of the stator module being covered with an insulation member, a securing part to secure the pump main body to the cover body, a load applying means provided between the securing part and the cover body so as to apply a load to the securing part and the cover body, a connector terminal electrically coupled to an external-connected terminal which is externally grounded, and a conductive-elastic member electrically coupled to the connector terminal and configured to make contact with the cover body as applying a load to the cover body. A discharge path is formed through the pump main body, the securing part, the load applying means, the cover body, the conduc-
(Continued)

tive-elastic member, and the connector terminal to discharge static electricity to the external via the external-connected terminal.

7 Claims, 6 Drawing Sheets (51) Int. Cl.
    *H02K 3/52*     (2006.01)
    *F04C 2/10*     (2006.01)
    *F04C 15/00*     (2006.01)
    *F04B 17/03*     (2006.01)
    *F04B 53/16*     (2006.01)
    *H02K 11/40*     (2016.01)
    *F04D 13/06*     (2006.01)
    *H02K 1/14*     (2006.01)

(52) U.S. Cl.
    CPC ........ *F04C 15/008* (2013.01); *F04D 13/0693* (2013.01); *H02K 3/522* (2013.01); *H02K 11/40* (2016.01); *F04C 2240/808* (2013.01); *H02K 1/146* (2013.01)

(56) References Cited

U.S. PATENT DOCUMENTS

| | | | |
|---|---|---|---|
| 6,987,338 B1 * | 1/2006 | Lavasser | A47L 5/12 15/412 |
| 2003/0131828 A1 | 7/2003 | Crary | |
| 2007/0025866 A1 | 2/2007 | Douyama et al. | |
| 2012/0201702 A1 | 8/2012 | Talaski | |
| 2012/0230850 A1 * | 9/2012 | Kawano | F04C 11/008 417/410.1 |
| 2013/0071267 A1 * | 3/2013 | Miyaki | F04C 2/10 417/410.1 |
| 2013/0137295 A1 * | 5/2013 | Kreil | F16L 37/0985 439/527 |
| 2014/0037472 A1 * | 2/2014 | Hibi | F04C 2/10 417/410.1 |
| 2015/0333596 A1 * | 11/2015 | Berkouk | H05K 1/18 310/71 |
| 2016/0204681 A1 * | 7/2016 | Saitou | H02K 11/40 310/68 R |

FOREIGN PATENT DOCUMENTS

| | | |
|---|---|---|
| JP | 2005337095 A | 12/2005 |
| JP | 2009036042 A | 2/2009 |
| JP | 2011236858 A | 11/2011 |

OTHER PUBLICATIONS

Extended European Search Report corresponding to Application No. 13871598.2-1608/2947319 PCT/JP2013/083058; dated Sep. 26, 2016.

\* cited by examiner

PUMP DEVICE

This is a U.S. national stage of application No. PCT/JP2013/083058, filed on Dec. 10, 2013. Priority under 35 U.S.C. § 119(a) and 35 U.S.C. § 365(b) is claimed from Japanese Patent Application No. 2013-004624 filed on Jan. 15, 2013, the disclosure of which is also incorporated herein by reference.

TECHNICAL FIELD

The present invention relates to a pump device.

BACKGROUND ART

In vehicles, such as automobiles and the like, pump devices using oil are used for cooling driving units, such as an engine and a motor (a driving motor or a generating motor). Such pump devices include, for example, a pump device driven by an electric motor as disclosed in Patent Document 1. The pump device disclosed in Patent Document 1 is configured with an electric motor including a stator integrally molded with a resin-made motor housing. A liquid pump (including a pump body and a pump cover and the like) is provided on the opposite side of a motor housing from a cover which covers a circuit substrate.

CITATION LIST

Patent Literature

{PTL 1} JP 2005-337095 A (Paragraph No. 0018)

SUMMARY OF INVENTION

Technical Problem

When a pump device integrated with an electric motor is driven, a static electricity might be generated in the liquid pump. It is difficult to discharge the static electricity to the external because the motor housing is formed of resin material having electric-insulating property. Thus when the potential of static electricity rises, a high voltage current instantly flows through a thin portion of a resin-made part, such as a motor housing, toward a circuit substrate. This current disturbs the decision made in the circuit substrate and may cause malfunction, such as a stopping of the pump device.

One solution to the problem caused by static electricity is to provide an electrically conducting portion by providing a metal housing in the external side of the resin-made motor housing. In such case, however, the liquid pump is configured disadvantageously large in size.

The present invention is made in view of the problem. The object of the present invention is to provide a pump device configured to discharge static electricity generated in the pump unit to the external without being configured large in size.

Solution to Problem

To solve the aforementioned problem, a first aspect of the present invention provides a pump device which is configured to suction and eject fluid by a cyclic-motion part driven by an electric motor to perform a cyclic motion, the pump device including a pump main body containing the cyclic-motion part, at least a portion of the pump main body being formed of a conductive material, a cover body at least a portion of which is formed of a conductive material, a stator module including a stator constituting the electric motor, at least a portion of the external of the stator module being covered with an insulation member having electric-insulating property to electrically insulate the pump main body from the cover body, a securing part inserted through the stator to secure the pump main body to the cover body, at least a portion of the securing part being formed of a conductive material, a load applying means provided between the securing part and the cover body so as to apply a load to the securing part and the cover body, at least a portion of the load applying means being formed of a conductive material, a connector terminal electrically coupled to an external-connected terminal which is externally grounded, at least a portion of the connector terminal being formed of a conductive material, and a conductive-elastic member electrically coupled to the connector terminal and configured to make contact with the cover body as applying a load to the cover body, at least a portion of the conductive-elastic member being formed of a conductive material. A discharge path is formed through the pump main body, the securing part, the load applying means, the cover body, the conductive-elastic member, and the connector terminal to discharge static electricity to the external via the external-connected terminal.

In another aspect according to the present invention, the pump device described above is preferably configured that the load applying means is a coil spring and the cover body is provided with a fit-in portion configured to fit into the coil spring.

In another aspect according to the present invention, the pump device described above is preferably configured that the stator includes a stator core provided with a through hole extending along a direction from the pump main body to the cover body, where the securing part is disposed in the through hole.

In another aspect according to the present invention, the pump device described above is preferably configured that the conductive-elastic member is a leaf spring member formed by bending a metal member and attached to a circuit substrate and the circuit substrate is provided with a conductive pattern electrically coupled to the connector terminal.

Advantageous Effects of Invention

According to the present invention, static electricity generated in the pump unit can be discharged to the external without the pump device being configured large in size.

DESCRIPTION OF EMBODIMENTS

An electric motor 30 and a pump device 10 including the electric motor 30 according to one embodiment of the present invention will be described below according to the drawings. In the description below, the axial direction of the inner shaft 31 is the X-direction, the direction toward a cover body 160 of the inner shaft 31 is the direction toward the X1 side, and the direction toward a pump cover 24 of the inner shaft 31 is the direction toward the X2 side.

<1. Regarding Configuration of Pump Device 10>

Figure 1:
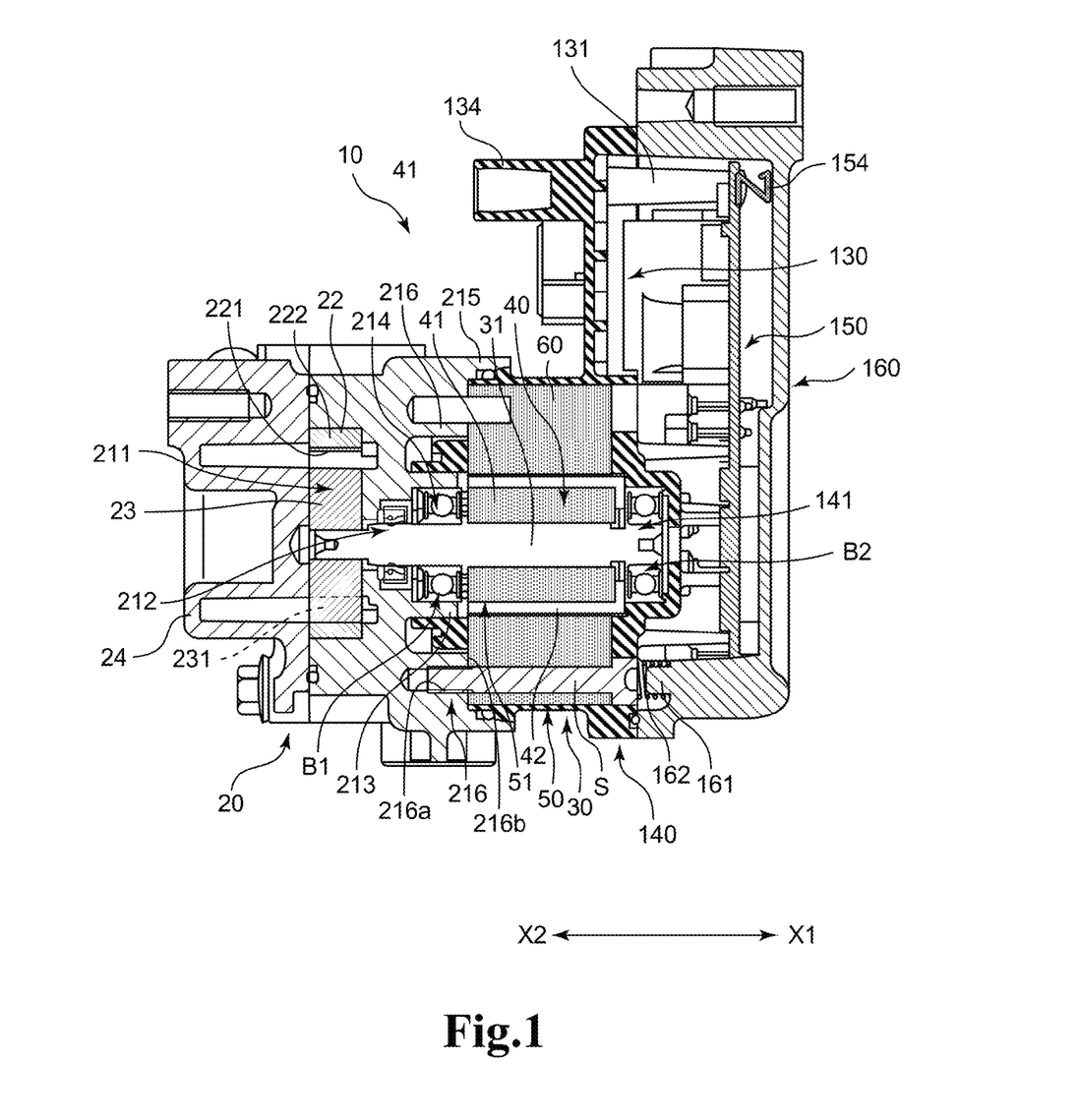
FIG. 1 is a side surface cross sectional view illustrating a configuration of a pump device according to an embodiment of the present invention.

FIG. 1 is a side surface cross sectional view illustrating a configuration of a pump device 10. The pump device 10 includes a pump unit 20 and an electric motor 30. In the present embodiment, the pump unit 20 is a trochoid pump (internal gear pump). The pump unit 20 includes a pump main body 21, and the pump main body 21 includes a depression portion 211 for disposing an outer rotor 22 and an inner rotor 23. The depression portion 211 extends from the end surface at the side of X2 of the pump main body 21 to the side of X1, and is formed to be depressed for a depth deep enough to accommodate the outer rotor 22 and the inner rotor 23, and the shape thereof in plan view is of the size corresponding to the outer rotor 22.

Further, the pump cover 24 is attached to the side of X2 of the pump main body 21, and accordingly the depression portion 211 is covered with the pump cover 24.

The outer rotor 22 is rotatably disposed in the depression portion 211. However, the rotation center of the outer rotor 22 is decentered with respect to the rotation center of the inner rotor 23 and the inner shaft 31. As is well known, the outer rotor 22 includes an inner peripheral depression portion 221 at the inner peripheral side, and the inner wall surface of the inner peripheral depression portion 221 serves as an internal gear 222. The inner rotor 23 is disposed in the inner peripheral depression portion 221, but the external gear 231 that comes into contact with or moves away from the internal gear 222 is provided on the external peripheral wall surface of the inner rotor 23. The internal gear 222 and the external gear 231 are formed by a trochoid curved line.

A bore in which the inner shaft 31 is inserted is provided along the rotational center of the inner rotor 23. The bore is configured to engage with the inner shaft 31. The outer rotor 22 and the inner rotor 23 corresponds to the cyclic-motion parts.

In this case, the pump device 10 is not limited to the trochoid pump explained above, and may use various kinds of pumps such as an external gear pump, a vane pump, a vortex pump, a cascade pump, a piston pump and the like.

As shown in FIG. 1, a penetration hole 212 is provided in the pump main body 21, and the inner shaft 31 is inserted into the penetration hole 212. The inner shaft 31 is rotatably supported by the pump main body 21 via the shaft bearing B1. The shaft bearing B1 is attached to a fit-in portion 214 surrounded by an annular internal flange 213. The other end side of the inner shaft 31 (the end portion side at the side of X1) is rotatably supported by a shaft bearing B2 attached to the depression fitting portion 141 of the stator module 140 explained later.

An annular external flange 215 surrounds the outer circumference side of the pump main body 21. A radial protrusion 216 is provided on the inner wall side of the external flange 215 to protrude radially inward side. A threaded hole 216a is drilled toward the X2 side in the radial protrusion 216. The stator module 140 can be secured on the pump main body 21 by screwing a securing bolt S, which will be described later, into the threaded hole 216a. The portion around the threaded hole 216a of the radial protrusion 216 serves as a supporting portion 216b which makes contact with a stator core 60, which will be described later. The pump main body 21 and the stator module 140 are fixed together by screwing the securing bolt S in the threaded hole 216a.

The securing bolt S is formed of metal, which is a conductive material, to constitute a discharge path of static electricity.

The pump main body 21 and the pump cover 24 are formed by die-casting of, for example, aluminum alloy. Alternatively, the pump main body 21 may be formed of any conductive material. Similarly to the pump main body 21 and the pump cover 24, the outer rotor 22 and the inner rotor 23 are preferably formed of conductive materials. For a practical purpose, for example, metal material, such as aluminum alloys (e.g., Al—Si based alloy, Al—Si—Cu based alloy, Al—Fe—Cu based alloy, Al—Si—Mg based alloy, Al—Si—Fe—Cu based alloy, or Al—SiC based composite material produced by adding SiC powder in an aluminum alloy) and iron based material (e.g., stainless steel or cast iron) is preferably used.

Figure 2:
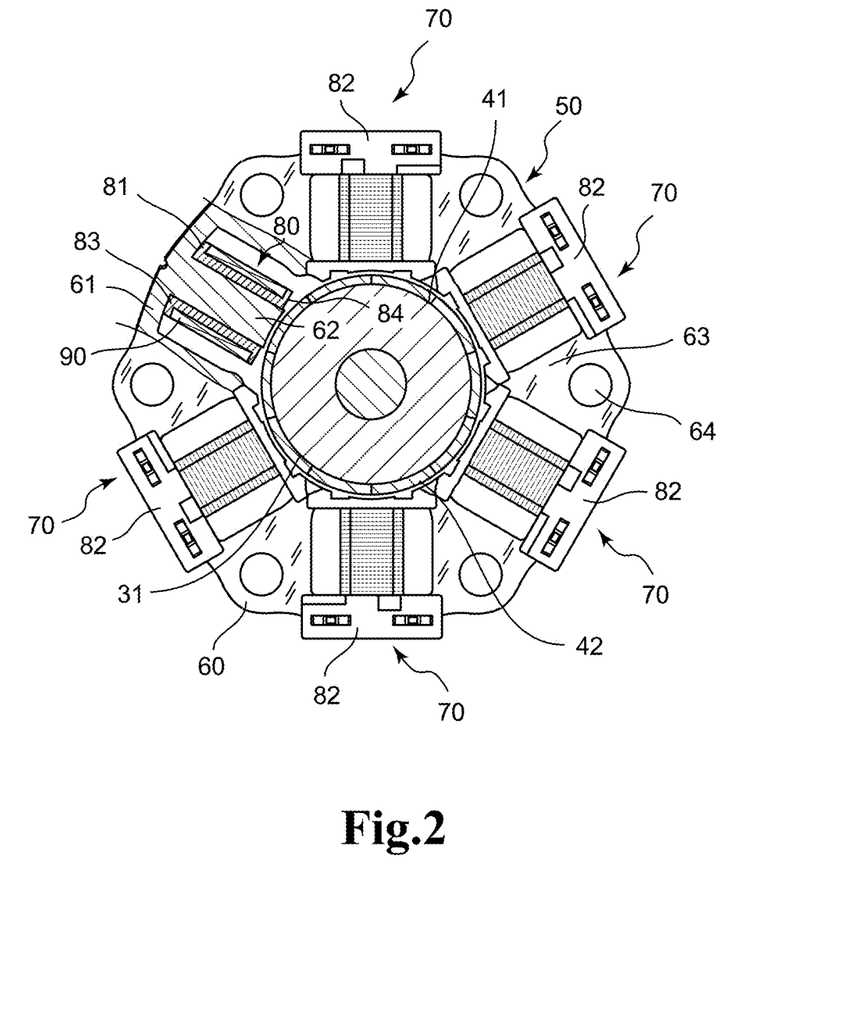
FIG. 2 is a top view illustrating a configuration of the electric motor of FIG. 1, and is also a figure illustrating a partial plane cross section.

Subsequently, a configuration of the electric motor 30 will be explained. FIG. 2 is a top view illustrating the configuration of the electric motor 30, but also illustrates a partial cross section. The electric motor 30 includes an inner shaft 31 common to the pump unit 20, and a rotor 40 is provided at the external peripheral side of the inner shaft 31. In the configuration as shown in FIG. 2, the rotor 40 includes a yoke 41 and a magnet 42. The yoke 41 is attached to the external peripheral side of the inner shaft 31, and for example, the yoke 41 is formed by stacking and molding process after pressing of an electromagnetic steel sheet such as a silicon steel sheet having an electrical insulating coating film on its surface. However, the yoke 41 may be formed using any kind of magnetic material such as, e.g., ferrite and dust core. Alternatively, a configuration not using any yoke 41 may also be employed.

The magnet 42 is attached to the external peripheral side of the yoke 41. The magnet 42 is attached to the external peripheral side of the yoke 41 in such a state that the magnetic pole changes with every predetermined angle. The rotor 40 of the electric motor 30 is constituted by the yoke 41 and the magnet 42 as explained above, but it is to be understood that other members (for example, the inner shaft 31) may also be included in the rotor 40. As explained later, when there are six coils on the stator 50, the same number of south poles and north poles are provided on the external peripheral side of the rotor 40. In FIG. 2, for example, 10 pieces (10 poles) are provided, but any number of poles may be provided in a combination limited in association with the number of teeth and the number of excitation phases of the coil. The magnet 42 may be, for example, a ferrite magnet, a neodymium magnet, a samarium-cobalt magnet, and an alnico magnet, or may use any kind of material. The rotor configuration may be such that, inside of the yoke 41, holes disposed equally according to the number of poles are provided, and the magnets are inserted thereto.

At the external peripheral side of the rotor 40, the stator 50 is disposed in such a state that the stator 50 faces the external peripheral side of the rotor 40 as shown in FIG. 2. More specifically, the rotor 40 is located in the central hole 51 of the stator 50. This stator 50 includes a stator core 60 and a coil wound body 70. For example, the stator core 60 is formed by stacking and molding process after pressing of an electromagnetic steel sheet such as a silicon steel sheet having an electrical insulating coating film on its surface. However, the stator core 60 may be formed using any kind of magnetic material other than electromagnetic steel plates, such as, e.g., ferrite and dust core.

In the stator core 60, an external peripheral ring portion 61, a main pole tooth 62, and a commutating pole tooth 63 are integrally provided. However, each portion constituting the stator core 60 may not be configured integrally. For example, the commutating pole tooth 63 may not be integrated with the main pole tooth 62, and separate configuration may also be employed. Alternatively, the stator core 60 may employ a configuration that is not provided with the commutating pole tooth 63. The external peripheral ring portion 61 is a ring-shaped portion of the stator core 60 that is located at the external peripheral side. The main pole tooth 62 is a portion protruding from the external peripheral ring portion 61 toward the inside in the diameter direction. In the present embodiment, the main pole tooth 62 is provided in a rectangular shape, and the coil wound body 70 explained later can be passed therethrough. The main pole teeth 62 are provided in the peripheral direction with every 60 degrees interval.

Between adjacent main pole teeth 62, a commutating pole tooth 63 is provided. The commutating pole tooth 63 is provided between the adjacent main pole teeth 62, and the existence of the commutating pole tooth 63 reduces cogging during operation. In the present embodiment, the width of the main pole teeth 62 does not become narrower toward the center, and therefore, the width of the commutating pole tooth 63 is provided to become narrower from the external peripheral side toward the center side. Alternatively, it may be configured without the commutating pole teeth 63.

As illustrated in FIG. 2, the stator core 60 is provided with a through hole 64. The through hole 64 is a hole portion to insert therein the securing bolt S. In the configuration illustrated in FIG. 2, the through hole 64 is provided in the region of the stator core 60 where no coil wound body 70 exists, that is, the region where the commutating pole teeth 63 exist. The through hole 64 may be provided in the commutating pole teeth 63 or in the external peripheral ring portion 61, or provided to extend over both the commutating pole teeth 63 and the external peripheral ring portion 61.

<2. Regarding Coil Wound Body 70>

Figure 3:
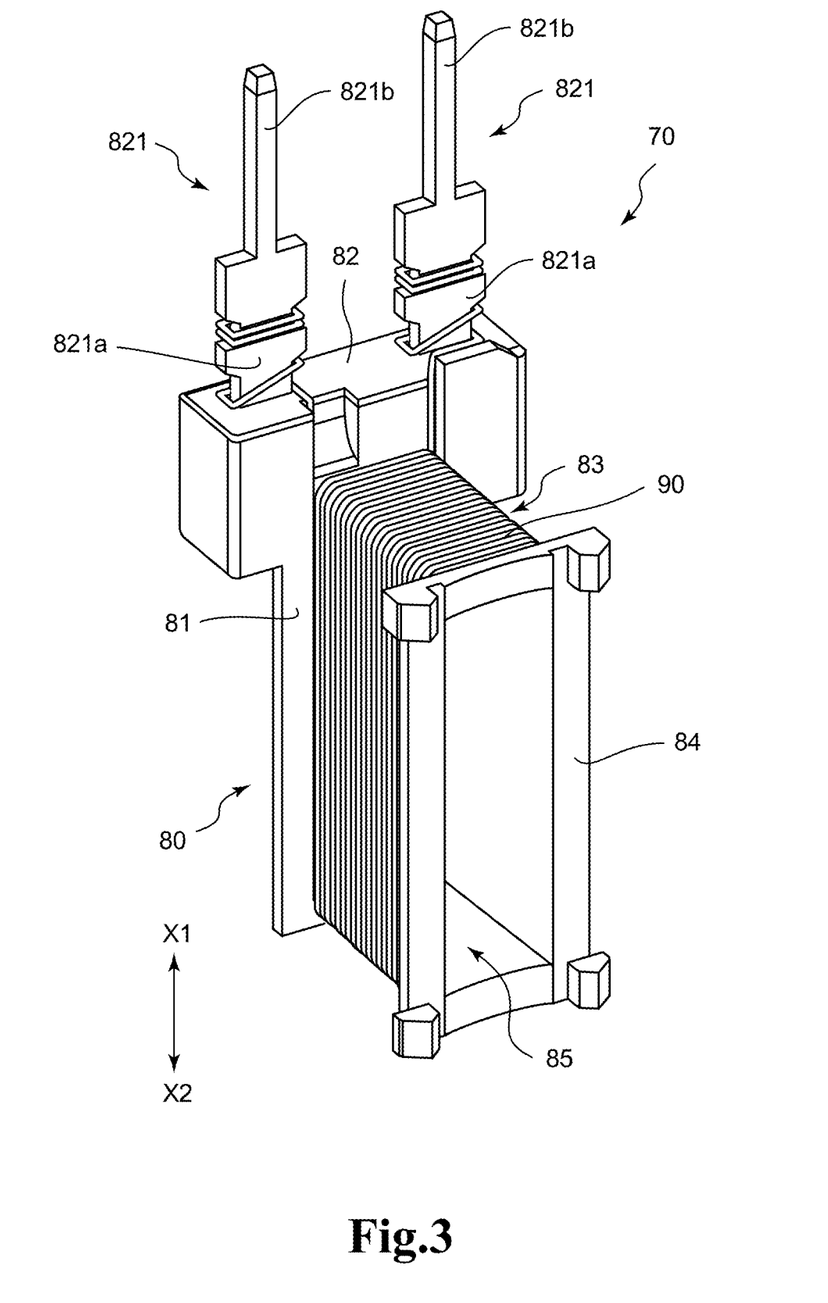
FIG. 3 is a perspective view illustrating a configuration of a coil wound body of the electric motor illustrated in FIG. 1, viewed from the side opposite to the portion which is to be attached to the pump unit.

FIG. 3 is a perspective view illustrating a configuration of the coil wound body 70. The coil wound body 70 as shown in FIG. 3 is attached to the main pole tooth 62. As illustrated in FIG. 2, the coil wound body 70 is attached to each of six main pole teeth 62 in the embodiment.

As shown in FIG. 3, the coil wound body 70 includes a bobbin 80 and a coil 90. The coil 90 is configured by winding a conductive wire around the bobbin 80. In this case, the coil 90 is formed by winding a conductive wire around the bobbin 80 which is a different body from the stator core 60, and therefore, the formation of the coil 90 can be made outside of the stator core 60. Therefore, the conductive wire can be wound densely, and this can improve the space factor. It should be noted that a square wire may be used instead of a round wire in order to improve the space factor.

The bobbin 80 includes an outer flange portion 81, a terminal base portion 82, a winding frame portion 83, and an inner flange portion 84. The bobbin 80 is provided with an insertion hole 85 penetrating from the outer flange portion 81 to the inner flange portion 84. The main pole tooth 62 explained above is inserted into the insertion hole 85.

The outer flange portion 81 is a portion located at the outer diameter side when attached to the main pole tooth 62, and is provided to have a wider width than the winding frame portion 83. The external peripheral side of the outer flange portion 81 comes into contact with the inner wall of the external peripheral ring portion 61, and accordingly, the positioning is achieved at the outer diameter side of the coil wound body 70 (see FIG. 2). The terminal base portion 82 is a portion protruding from an end portion at X1 side of the outer flange portion 81 to the outer diameter side and X1 side.

A connection terminal 821 is integrally attached to this terminal base portion 82. The connection terminal 821 is made of a conductive material having conductivity (metal and the like). The connection terminal 821 is provided with a binding portion 821a and a pin portion 821b, and among them, the binding portion 821a is bound with the end of the conductive wire which forms the coil 90, and is electrically connected to the conductive wire by soldering and the like. The pin portion 821b is a pin-shaped portion protruding to the X1 side than the binding portion 821a, and is inserted into a pin hole of a circuit substrate explained later.

The winding frame portion 83 is a portion located between the outer flange portion 81 and the inner flange portion 84, and is a portion where the conductive wire is wound and the coil 90 is formed. In the winding frame portion 83, the positioning can be achieved when this conductive wire is wound. The inner flange portion 84 is a portion of the bobbin 80 that is located closest to the inner diameter side. Like the outer flange portion 81, this inner flange portion 84 is provided to have a wider width than the winding frame portion 83.

<3. Regarding Substrate Attachment Unit 130 and Circuit Substrate 150>

In the stator 50 explained above, the coil wound body 70 is attached to the stator core 60, and further in the state in which the shaft bearing B2 is attached, for example, over molding is performed to inject resin, so that they are fixed. The integrated structure thus formed is hereinafter referred to as a stator module 140. At this occasion, the shaft bearing B2 is located at the depression fitting portion 141 of the stator module 140.

Figure 4:
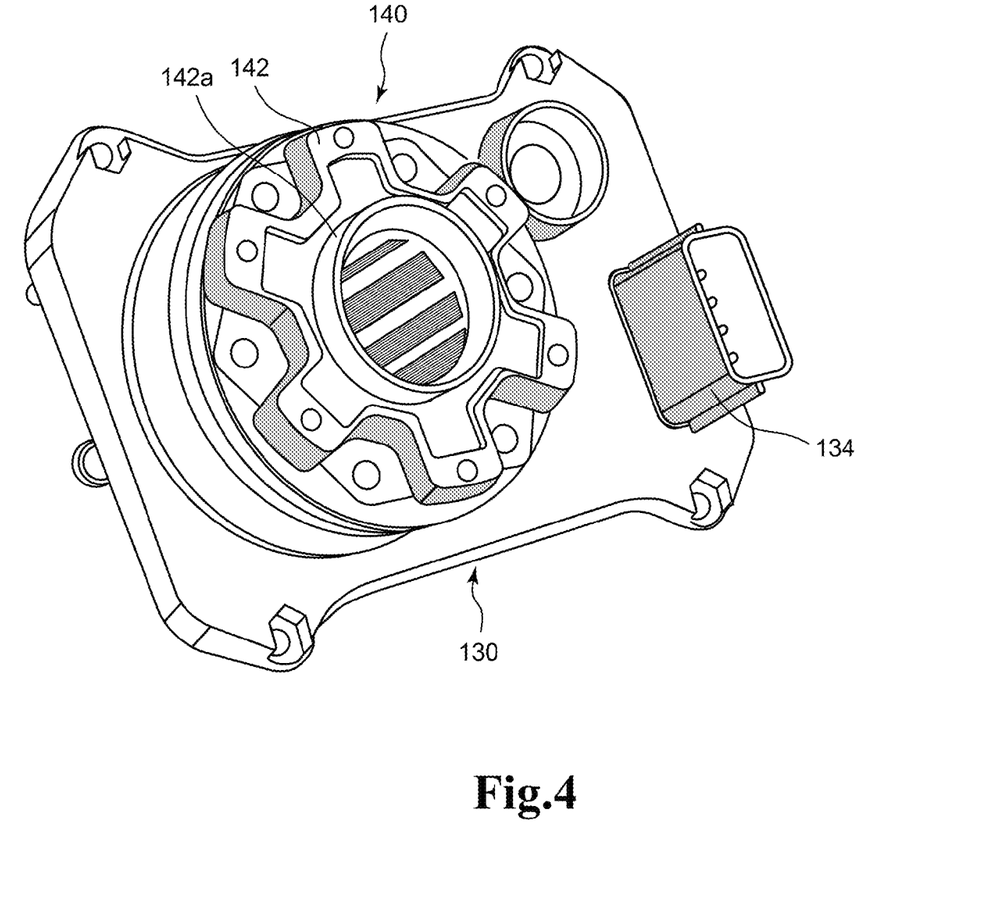
FIG. 4 is a perspective view illustrating a configuration of a stator of the electric motor illustrated in FIG. 1.

FIG. 4 is a perspective view illustrating a configuration of the stator module 140, viewed from the side opposite to the portion which is to be attached to the pump unit. As illustrated in FIG. 4, in the stator module 140 formed by overmolding, the attachment portion of the coil wound body 70 is covered with resin, which has electric-insulating property. When the stator module 140 is attached to the pump unit 20 (see FIG. 1), the resin-covered portion protrudes toward the pump unit 20 (X2 side). Of the portion of the stator 50 in the X2 side, the portion covered with resin will be referred to as an insulating cover 142.

The insulating cover 142 is provided so as to cover the coil wound body 70 to insulate the coil 90. A ring-shaped part 142a annularly protruding is provided on the insulating cover 142. The internal flange 213 is located in the ring-shaped part 142a and the stator module 140 is positioned to the pump main body 21.

Figure 5:
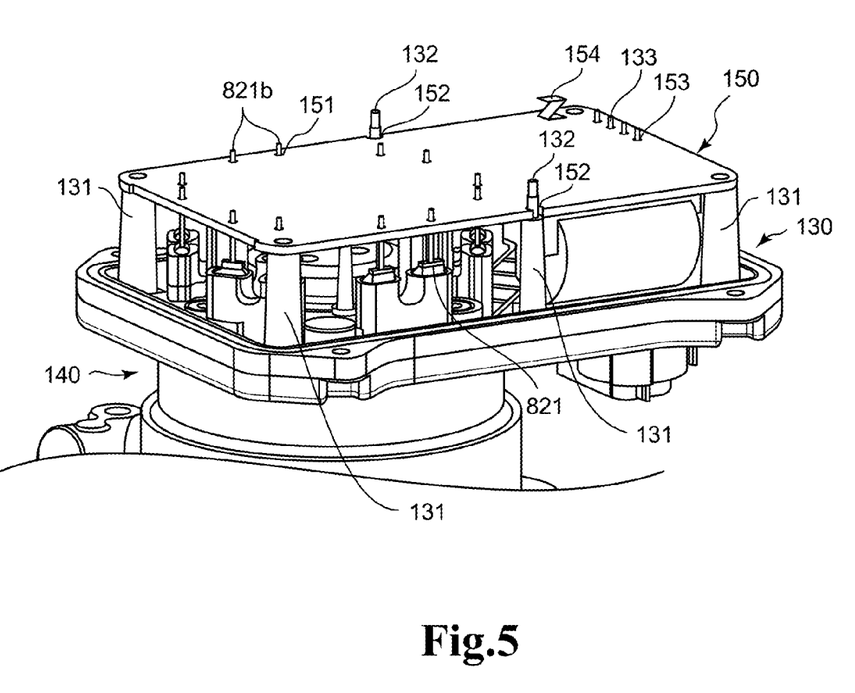
FIG. 5 is a perspective view illustrating a state in which not only the stator of FIG. 1 but also a substrate attachment unit for attaching a circuit substrate is formed by such over molding.

FIG. 5 is a perspective view illustrating a state in which not only the stator 50 but also the substrate attachment unit 130 for attaching the circuit substrate 150 is formed by over molding mentioned above. As illustrated in FIG. 5, the stator 50 and the resin-made substrate attachment unit 130 are integrated by overmolding and become together a portion of the stator module 140.

As shown in FIG. 5, the substrate attachment unit 130 has multiple bosses 131 provided in a protruding manner. The distal end side of the protrusion of the boss 131 can receive the circuit substrate 150. The boss 131 is provided with a screw hole, not shown. Therefore, a screw is inserted into the penetration hole of the circuit substrate 150, and the screw is screwed into the boss 131, so that the circuit substrate 150 is attached to the substrate attachment unit 130.

The substrate attachment unit 130 is provided with position determination pins 132. The position determination pin 132 is provided to extend from the boss 131 located at the center side in the longitudinal direction of the substrate attachment unit 130. The position determination pin 132 extends from the side of the stator core 60 in a direction away therefrom. In the present embodiment, a distal end portion of the boss 131 has a larger diameter than the position determination pin 132, and therefore, the boss 131 serves as a receiving unit for receiving the circuit substrate 150. On the other hand, the position determination pin 132 extends sufficiently longer than the pin portion 821b of the connection terminal 821 explained above as it extends away from the stator core 60. The extension length of the position determination pin 132 is configured to be longer than a size obtained by adding the thickness of the circuit substrate to the pin portion 821b.

As illustrated in FIG. 5, each of the position determination pins 132 is provided on the outer edge along the longitudinal direction of the circuit substrate 150 (totally a pair of position determination pins 132 are provided). However, the number of position determination pins 132 may be any number.

A connector terminal 133 is attached to the substrate attachment unit 130. The other end side (in the X2 side) of the connector terminal 133 is exposed to the inside of a connector cover 134 (see FIGS. 1 and 4) and is electrically coupled to the external-connected terminal (not shown). One end side (in the X1 side) of the connector terminal 133 protrudes from the resin portion of the substrate attachment unit 130. As illustrated in FIG. 5, four connector terminals 133 are provided in the embodiment. The connector terminals 133 are arrayed in line. However, the number of connector terminals 133 is not limited to that of the embodiment, and the arrangement of connector terminals 133 is not limited to the in-line array. The protruding amount of the connector terminal 133 is about the length such that the connector terminal 133 can be inserted in the terminal hole 153 of the circuit substrate 150 explained later.

One of four connector terminals 133 is grounded via the external-connected terminal. Accordingly, this connector terminal 133 constitutes the discharge path of static electricity. However, a plurality of connector terminals 133 may be grounded via the external terminal.

As illustrated in FIG. 5, the circuit substrate 150 is provided with a pin hole 151 in which the pin portion 821b of the connection terminal 821 is inserted. In the configuration provided with six connection terminals 821 illustrated in FIG. 5, total of twelve pin holes 151 are provided. A conductive portion is provided around the pin hole 151. By inserting the pin portion 821b in the pin hole 151 and additionally soldering or attaching a member as required, the circuit substrate 150 and the connection terminal 821 are electrically coupled.

As illustrated in FIG. 5, a position determination depression portion 152 is provided in substantially middle portion along the longitudinal direction on the circuit substrate 150. The position determination depression portion 152 is formed by denting the outer rim of the circuit substrate 150 inward along the lateral direction of the circuit substrate 150. The position determination pin 132 is inserted in the position determination depression portion 152. In this manner, the circuit substrate 150 is positioned to the substrate attachment unit 130, thereby allowing the pin portion 821b to be inserted in the pin hole 151 easily. Position determination depression portions 152 are provided by the same number as the position determination pins 132, although a larger number of position determination depression portions 152 may be provided.

As illustrated in FIG. 5, the circuit substrate 150 is provided with a terminal hole 153 in which the connector terminal 133 is inserted. The number of terminal holes 153 corresponds to the number of connector terminals 133. In the configuration provided with four connector terminals 133 illustrated in FIG. 5, four connector terminals 133 arranged in line are provided. The circuit substrate 150 is provided with four terminal holes 153 arrayed in line. A conductive portion is provided around the terminal hole 153, and a conductive pattern is provided on the circuit substrate 150. By inserting the connector terminal 133 in the terminal hole 153 and additionally soldering and attaching a member as required, the circuit substrate 150 and the connector terminal 133 are electrically coupled.

On the circuit substrate 150, a conductive-elastic member 154 constituting the discharge path of static electricity is attached. The conductive-elastic member 154 makes contact with a cover body 160, which will be described later, and is compressed by a certain degree with a load being applied to the cover body 160. The conductive-elastic member 154 is formed of conductive material (e.g., a metal). The conductive-elastic member 154 is formed by bending a metal. In the configuration illustrated in FIG. 1, the conductive-elastic member 154 has a Z-shape in the side view. However, the conductive-elastic member 154 may have any shape which can be compressed by a certain degree by making contact with the cover body 160 with a load being applied to the cover body 160.

The conductive-elastic member 154 is electrically coupled to one of four connector terminals 133 which is grounded via the external-connected terminal (in the embodiment, one that is nearest to the conductive-elastic member 154 of four connector terminals 133). To form this electrical coupling, the circuit substrate 150 is provided with a conductive pattern (not shown) which couples the terminal hole 153 and the portion where the conductive-elastic member 154 is attached.

Figure 6:
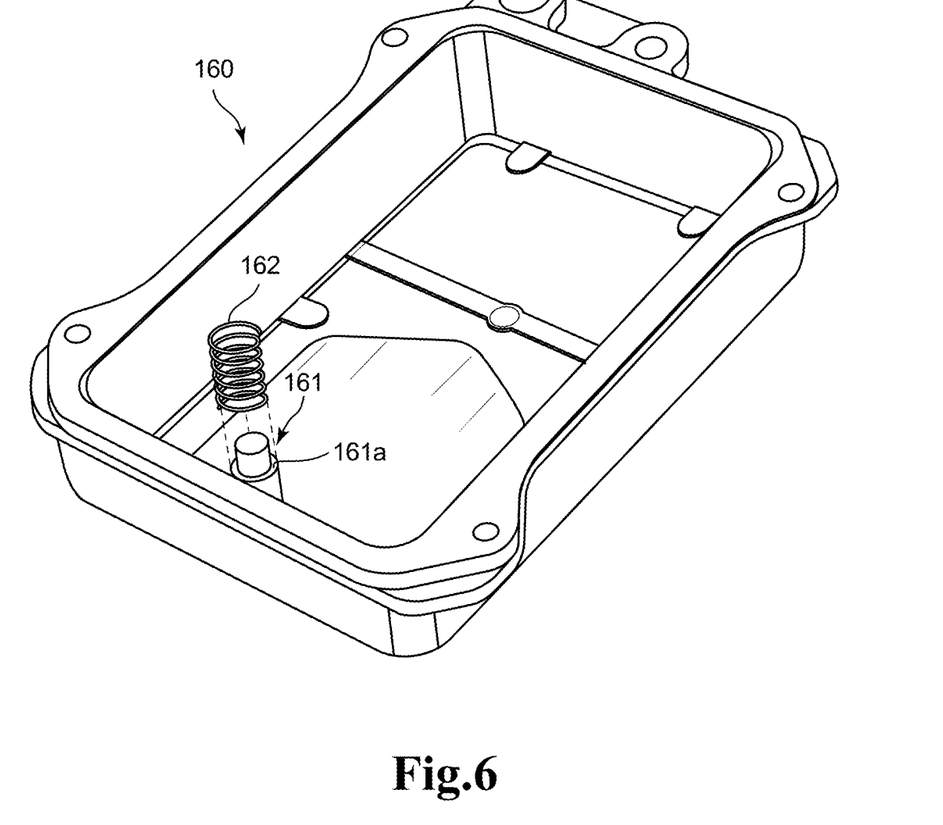
FIG. 6 is a perspective view illustrating a configuration of a cover body of the pump device illustrated in FIG. 1.

As illustrated in FIG. 1, a cover body 160 is attached to the substrate attachment unit 130. FIG. 6 is a perspective view illustrating a configuration of the cover body 160 of the pump device 10. The cover body 160 has a function of arranging the circuit substrate 150 between the cover body 160 and the substrate attachment unit 130 so as to protect the circuit substrate 150. The cover body 160 constitutes a discharge path of static electricity. To form the discharge path, the cover body 160 is formed of an electrically conductive material (e.g., a metal).

Similarly to the pump main body 21 and the pump cover 24, the cover body 160 is formed by die-casting of, for example, aluminum alloy. Alternatively, the cover body 160 may be formed of any conductive material. For a practical purpose, a material similar to that used for the pump main body 21 and the pump cover 24 is preferably used.

The cover body 160 is provided with a spring receiver 161. The spring receiver 161 is a portion to which a coil spring 162 as illustrated in FIG. 6 is attached. The spring receiver 161 has a stepped portion 161a to receive the coil spring 162. The coil spring 162 can thus be disposed between the spring receiver 161 (stepped portion 161a) and the securing bolt S. The spring receiver 161 corresponds to the fit-in portion.

As illustrated in FIG. 1, the coil spring 162 is disposed between the securing bolt S and the stepped portion 161a and applies a load to the securing bolt S and the stepped portion 161a. The coil spring 162 functions as a compression spring, not as an extension spring. The coil spring 162 is formed of a conductive material (e.g., a metal) having a conducive property such as stainless steels having spring property, for example. Alternatively, the coil spring 162 may be formed from any elastic member made of other metals (e.g., a hard steel wire, a piano wire or the like). The coil spring 162 constitutes a discharge path of static electricity. The coil spring 162 corresponds to the load applying means.

<4. Regarding Discharge of Static Electricity in Pump Device 10>

The discharge of static electricity in the pump device 10 will now be described. When the pump device 10 is driven, the pump unit 20 and the cover body 160 may be electrostatically charged. In the embodiment, the discharge path of static electricity is formed through the pump main body 21, the securing bolt S, the coil spring 162, the cover body 160, the conductive-elastic member 154, the conductive pattern on the circuit substrate 150, and the connector terminal 133 inserted in the terminal hole 153. The static electricity flows via the discharge path to the grounded external-connected terminal. In this manner, the discharge of static electricity is appropriately performed, and the pump main body 21, the pump cover 24, and the cover body 160 are free of electrostatic charge.

<5. Effects>

As described above, the pump device 10 includes the discharge path to discharge the static electricity generated in the pump unit 20 to the grounded external-connected terminal. The static electricity generated in the pump unit 20 can appropriately be discharged to the external. This discharge prevents the increase in potential of the pump unit 20. Consequently, an instant high voltage current flowing through a thin portion of a resin-made part of the stator module 140 including the stator 50 can be prevented, and thus an erroneous decision made in the circuit substrate due to such current can be prevented. As a result, malfunction, such as a stopping of the pump device 10, can be prevented.

The embodiment needs not have a part, such as a metal-made housing, provided on the external of the stator 50 (stator module 140), to discharge static electricity. So that the pump device 10 need not be configured large in size.

The embodiment is provided with a coil spring 162, functioning as the load applying means, disposed between the securing bolt S and the cover body 160, where the securing bolt S is inserted in the through hole 64 of the stator core 60 to be screwed into the pump main body 21. So that even when a gap exists between the securing bolt S and the cover body 160, the electric coupling between the securing bolt S and the cover body 160 can appropriately be maintained. The coil spring 162, functioning as the load applying means, is in contact with the securing bolt S as well as the cover body 160 and applies a load to the securing bolt S and the cover body 160. Moreover, the coil spring 162 is formed of metal having conductive property. Thus the coil spring 162 can absorb any assembly error or any gap between the securing bolt S and the cover body 160 to form the discharge path of static electricity.

In the embodiment, the coil spring 162 functions as the load applying means, and the cover body 160 is provided with the spring receiver 161 which fits into the coil spring 162. In this configuration, the positioning error or dropping from the correct position of the coil spring 162 during attaching of the cover 160 to the stator module 140 can be prevented. Thus the attaching (assembly) of the cover 160 to the stator module 140 can be performed with ease, and the productivity improves. By preventing the positioning error or dropping from the correct position of the coil spring 162 disposed between the cover body 160 and the securing bolt S, the discharge path can surely be provided.

In the embodiment, the stator core is provided with the through hole 64 extending along the direction from the pump main body 21 to the cover body 160, and the securing bolt S is disposed in the through hole 64. Namely, the securing bolt S is penetratingly disposed through the inside of the stator core 60. So that the pump device 10 can be made small compared to the configuration having a member for conducting electricity to the external of the stator core 60.

In the embodiment, the conductive-elastic member 154, which is a leaf spring member formed of a bent metal member, attached to the circuit substrate 150. The conductive pattern is formed on the circuit substrate 150 to be electrically coupled to the connector terminal 133. The current flowing from the pump main body 21 side to the cover body 160 is introduced to the external-connected terminal via the conductive-elastic member 154, the conductive pattern on the circuit substrate 150, and the connector terminal 133. In this manner, electrostatic charging of the cover body 160 can be prevented, and thus troublesome in the circuit substrate 150 and malfunction of the pump device 10 are appropriately prevented.

<Modification>

Each embodiment of the present invention has been hereinabove explained, but the present invention can be modified in various manners other than the above. This will be hereinafter explained.

In the embodiment described above, the coil spring 162 is used as the load applying means. Although, the load applying means is not limited to the coil spring 162. For example, a member similar to the conductive-elastic member 154, a metal member that buckles (buckling spring), a volute spring, or a leaf spring may be used as the load applying means.

In the embodiment described above, the spring receiver 161 formed in a boss-shape is used as the fit-in portion. Alternatively, any part allowing the coil spring 162 to be attached thereto can be used as the fit-in portion. For example, a pocket may be provided to fit therein the coil spring 162.

In the embodiment described above, the securing bolt S is used as the securing part. Although, the securing part is not limited to the securing bolt S. Other parts, for example, a welding pin may be used as the securing part.

In the embodiment, the pump main body 21, the securing bolt S, the coil spring 162, the cover body 160, the conductive-elastic member 154, the conductive pattern on the circuit substrate 150, and the connector terminal 133 inserted in the terminal hole 153 are formed of conductive materials. However, the entire portion of each member is not necessarily made of conductive material. Only a portion of each of members may be formed of a conductive material as long as the discharge path of static electricity can be provided.

The conductive material is preferably a metal. Alternatively, a material other than metal may be used. The conductive material other than metals, for example, conductive resin or carbon material such as carbon fibers may be used.

REFERENCE SIGNS LIST 10 pump device
20 pump unit
21 pump main body
22 outer rotor
23 inner rotor
30 electric motor
31 inner shaft
40 rotor
41 yoke
42 magnet
50 stator
60 stator core
62 main pole teeth
63 commutating pole teeth
70 coil wound body
80 bobbin
82 terminal base portion
84 inner flange portion
90 coil
130 substrate attachment unit
131 boss
132 position determination pin
133 connector terminal
140 stator module
150 circuit substrate
151 pin hole
152 depression portion
153 terminal hole
154 conductive-elastic member
160 cover body
161 spring receiver (corresponds to fit-in portion)
161a stepped portion
162 coil spring (corresponds to load applying means)
821 connection terminal
821b pin portion

The invention claimed is:

1. A pump device configured to suction and eject fluid by a cyclic-motion part driven by an electric motor to perform a cyclic motion, the pump device comprising:
    a pump main body containing the cyclic-motion part, at least a portion of the pump main body being formed of a conductive material;
    a cover body at least a portion of which is formed of a conductive material;
    a stator module including a stator constituting the electric motor, at least a portion of an external shape of the stator module being covered with an insulation member having electric-insulating property to electrically insulate the pump main body from the cover body;
    a securing part inserted through the stator to secure the stator module to the pump main body, at least a portion of the securing part being formed of a conductive material;
    a coil spring provided between the securing part and the cover body so as to apply a load to the securing part and the cover body, at least a portion of the coil spring being formed of a conductive material;
    a connector terminal electrically coupled to an external-connected terminal which is externally grounded, at least a portion of the connector terminal being formed of a conductive material; and
    a conductive-elastic member electrically coupled to the connector terminal and configured to make contact with the cover body as applying a load to the cover body, at least a portion of the conductive-elastic member being formed of a conductive material, a discharge path being formed through the pump main body, the securing part, the coil spring, the cover body, the conductive-elastic member, and the connector terminal to discharge static electricity to an external side of the pump device via the external-connected terminal.

2. The pump device according to claim 1, wherein the cover body is provided with a fit-in portion configured to fit into the coil spring.

3. The pump device according to claim 1, wherein the stator includes a stator core, and the stator core is provided with a through hole extending along a direction from the pump main body to the cover body, the securing part being disposed in the through hole.

4. The pump device according to claim 1, wherein the conductive-elastic member is a leaf spring member formed by bending a metal member and electrically coupled to the connector terminal.

5. The pump device according to claim 2, wherein the stator includes a stator core, and the stator core is provided with a through hole extending along a direction from the pump main body to the cover body, the securing part being disposed in the through hole.

6. The pump device according to claim 2, wherein the conductive-elastic member is a leaf spring member formed by bending a metal member and electrically coupled to the connector terminal.

7. The pump device according to claim 3, wherein the conductive-elastic member is a leaf spring member formed by bending a metal member and electrically coupled to the connector terminal.

* * * * *